(12) United States Patent
Akl et al.

(10) Patent No.: US 11,832,140 B2
(45) Date of Patent: Nov. 28, 2023

(54) INTER-DONOR CELL MANAGEMENT IN WIRELESS COMMUNICATION NETWORK

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/239,432

(22) Filed: Apr. 23, 2021

(65) Prior Publication Data

US 2021/0345206 A1 Nov. 4, 2021

Related U.S. Application Data

(60) Provisional application No. 63/018,425, filed on Apr. 30, 2020.

(51) Int. Cl.
| | |
|---|---|
| *H04W 4/00* | (2018.01) |
| *H04W 36/08* | (2009.01) |
| *H04W 48/16* | (2009.01) |
| *H04W 36/00* | (2009.01) |
| *H04W 92/20* | (2009.01) |

(52) U.S. Cl.
CPC ....... *H04W 36/08* (2013.01); *H04W 36/0055* (2013.01); *H04W 48/16* (2013.01); *H04W 92/20* (2013.01)

(58) Field of Classification Search
CPC . H04W 36/08; H04W 36/0055; H04W 48/16; H04W 92/20
See application file for complete search history.

(56) References Cited

U.S. PATENT DOCUMENTS

| | | | |
|---|---|---|---|
| 2013/0183971 A1* | 7/2013 | Tamaki | H04W 36/165 455/436 |
| 2013/0250918 A1 | 9/2013 | Liu et al. | |
| 2022/0322464 A1* | 10/2022 | Luo | H04W 76/10 |
| 2022/0361072 A1* | 11/2022 | Zhu | H04W 36/0061 |

OTHER PUBLICATIONS

International Search Report and Written Opinion—PCT/US2021/029155—ISA/EPO—dated Aug. 9, 2021.

* cited by examiner

*Primary Examiner* — Justin Y Lee
(74) *Attorney, Agent, or Firm* — Loza & Loza, LLP

(57) ABSTRACT

Aspects relate to technologies and techniques for migrating a radio access network (RAN) node associated with a first donor node in a communications network. The first donor node may receive, via a first communications interface, such as an F1-C or resource control (RRC) interface, cell configuration data associated with one or more cells of the RAN node activated by the first donor node. The first donor node may process the cell configuration data and transit the cell configuration data, using a second communications interface, such as an Xn or X2 interface, to a second donor node for use in migrating the RAN node from the first donor node to the second donor node.

26 Claims, 13 Drawing Sheets

INTER-DONOR CELL MANAGEMENT IN WIRELESS COMMUNICATION NETWORK

CROSS-REFERENCE TO RELATED APPLICATIONS

This application claims priority to provisional U.S. App. No. 63/018,425, filed on Apr. 30, 2020 to Akl et al, titled "Inter-Donor Cell Management in Wireless Commination Network," the contents of which is incorporated by reference in its entirety herein.

TECHNICAL FIELD

The technology discussed below relates generally to wireless communication networks, and more particularly, to technologies and techniques for inter-donor cell management in wireless communication networks, such as integrated access and backhaul (IAB) networks.

INTRODUCTION

In 5G New Radio wireless communication networks, resources may be shared between access networks and backhaul networks. For example, the wireless spectrum may be used for both access links (e.g., links between base stations and user equipment (UEs)) and backhaul links (e.g., links between base stations and the core network). In such integrated access backhaul (IAB) networks, the base station functionality can be logically separated into a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. In an example IAB network architecture, the CU may be implemented at an edge IAB node, which may be referred to as an IAB donor node The DUs may be co-located with the CU and/or distributed through multiple base stations or other radio access network (RAN) nodes within the IAB network.

The CU and DU(s) are connected via an F1 interface, which utilizes an F1 application protocol (F1-AP) to convey information between the CU and the DU(s). Neighboring nodes (e.g., gNBs) may communicate via an X2 or Xn interface. Enhancements to IAB cell management continue to be developed to support functionalities and features of IAB networks.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method is disclosed of migrating a radio access network (RAN) node associated with a first donor node in a communications network. The method includes receiving, in the first donor node via a first communications interface, cell configuration data associated with the RAN node, the cell configuration data including data associated with one or more cells of the RAN node activated by the first donor node. The method may also include processing the cell configuration data for migrating the one or more cells to a second donor node, and transmitting the processed cell configuration data, via a second communications interface, to the second donor node for use in migrating the RAN node from the first donor node to the second donor node.

Another example provides a first donor node within a wireless communication network. The first donor node may include a first communications interface, a second communications interface, a memory, and a processor communicatively coupled to the transceiver and the memory. The processor and the memory may be configured to receive, in the first donor node via a first communications interface, cell configuration data associated with the RAN node, the cell configuration data including data associated with one or more cells of the RAN node activated by the first donor node. The processor and memory may also be configured to process the cell configuration data for migrating the one or more cells to a second donor node, and transmit the processed cell configuration data, via a second communications interface, to the second donor node for use in migrating the RAN node from the first donor node to the second donor node.

Another example provides a first donor node within a wireless communication network, wherein the first donor node includes means for receiving, in the first donor node via a first communications interface, cell configuration data associated with the RAN node, the cell configuration data including data associated with one or more cells of the RAN node activated by the first donor node. The donor node may also include means for processing the cell configuration data for migrating the one or more cells to a second donor node, and means for transmitting the processed cell configuration data, via a second communications interface, to the second donor node for use in migrating the RAN node from the first donor node to the second donor node.

Another example provides a computer-readable medium having stored therein instructions executable by one or more processors of a first donor node to receive, in the first donor node via a first communications interface, cell configuration data associated with the RAN node, the cell configuration data including data associated with one or more cells of the RAN node activated by the first donor node, process the cell configuration data for migrating the one or more cells to a second donor node, and transmit the processed cell configuration data, via a second communications interface, to the second donor node for use in migrating the RAN node from the first donor node to the second donor node.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
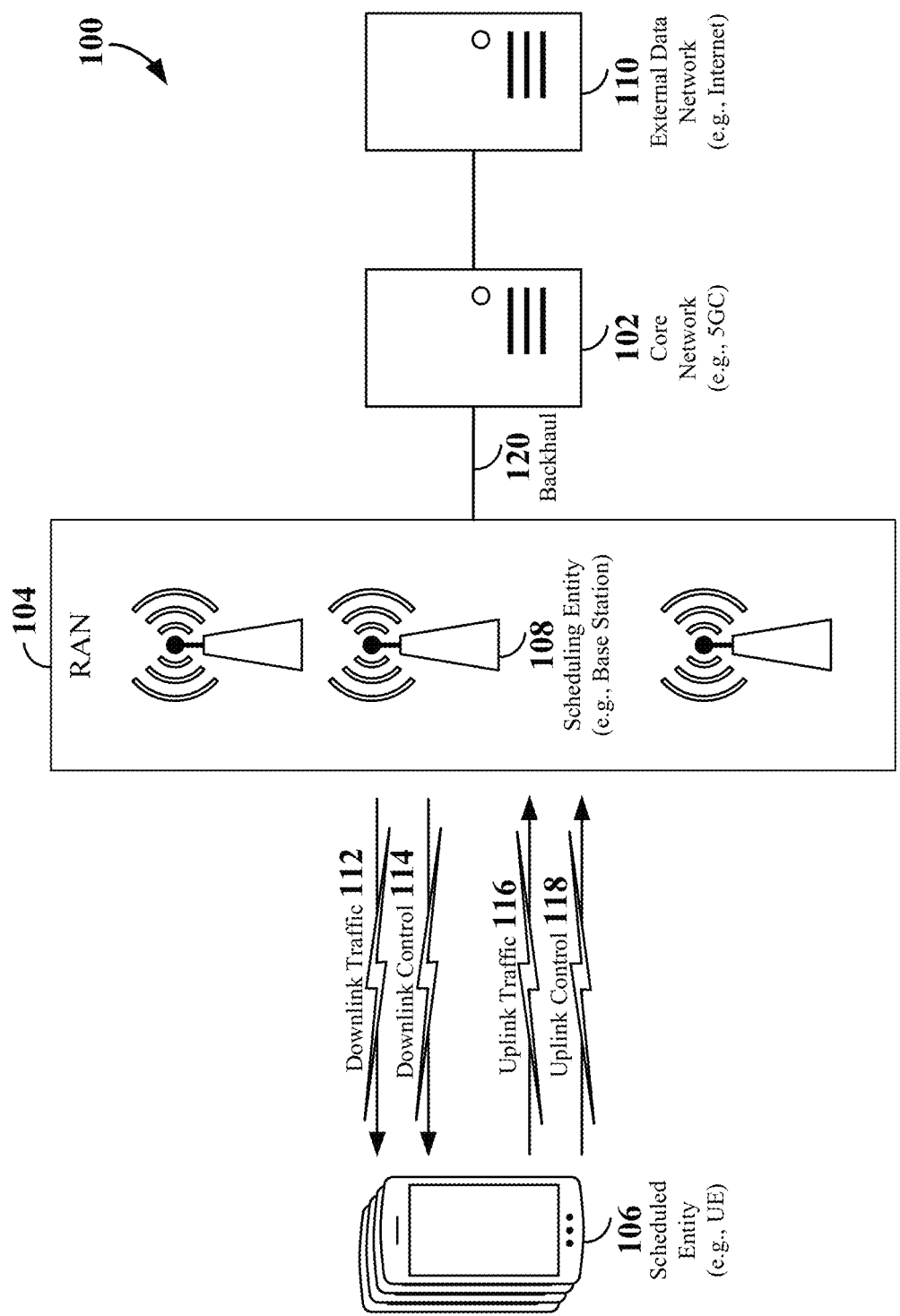
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
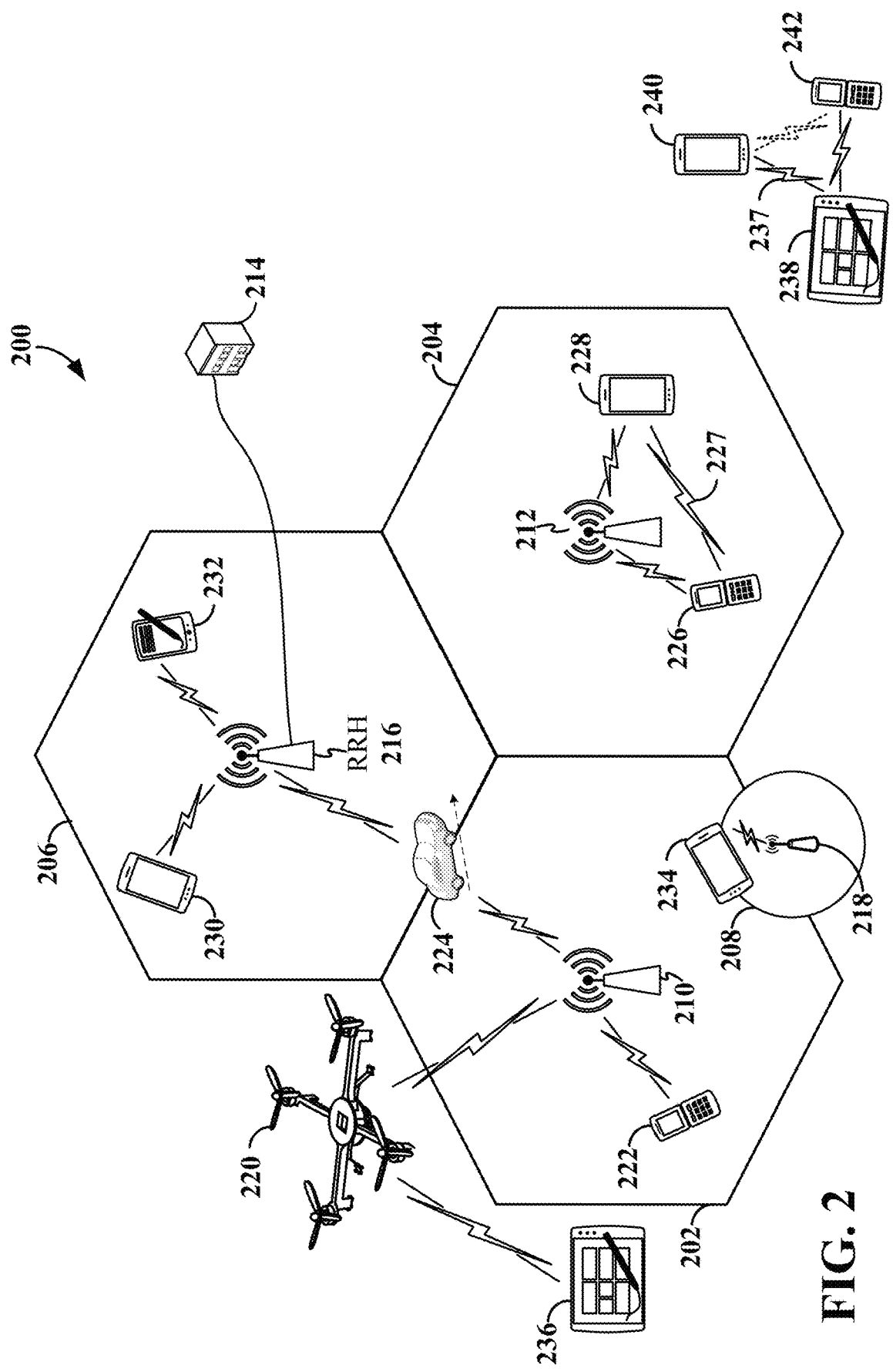
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
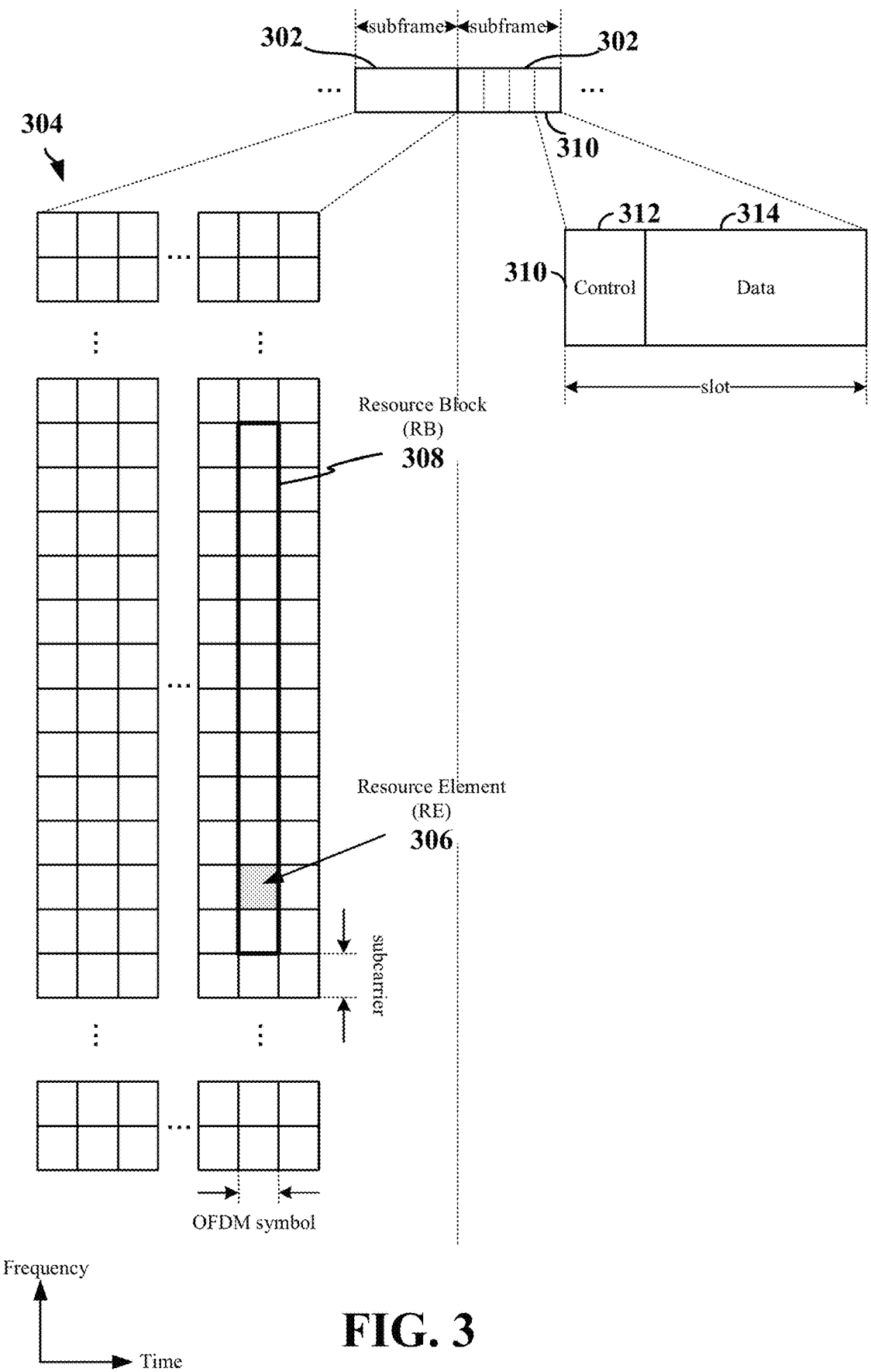
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
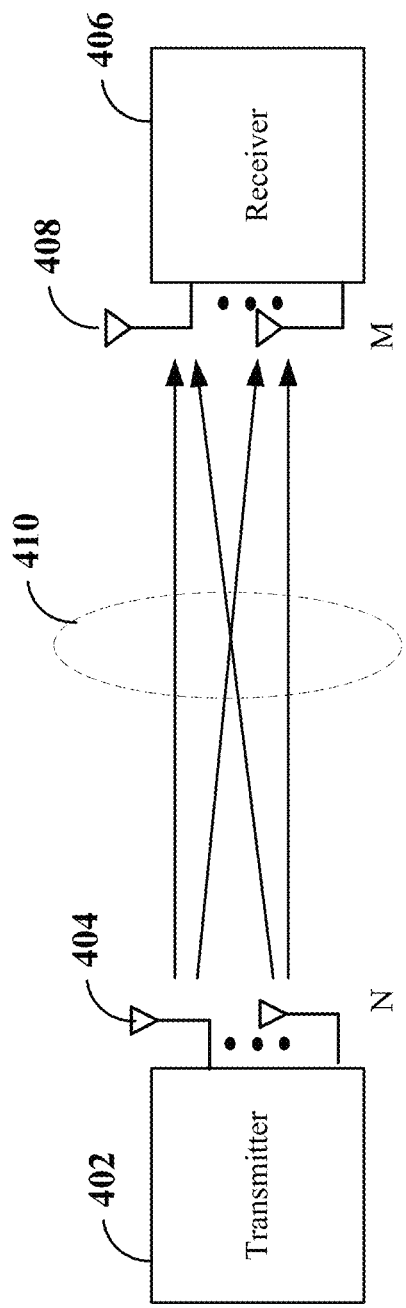
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In some examples, to select a particular beam for communication with a UE, the base station may transmit a reference signal, such as an SSB or channel state information reference signal (CSI-RS), on each of a plurality of beams (SSB beams) in a beam-sweeping manner The UE may measure the reference signal received power (RSRP), reference signal received quality (RSRQ) or SINR on each of the beams and transmit a beam measurement report to the base station indicating the RSRP of each of the measured beams The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In 5G NR networks, a base station may be an aggregated base station, in which the radio protocol stack is logically integrated within a single RAN node, or a disaggregated base station, in which the radio protocol stack is logically split between a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. The CU may be implemented within an edge RAN node, which may be referred to as a donor node, while the one or more DUs may be co-located with the CU and/or distributed throughout multiple RAN nodes that may be physically separated from one another. Disaggregated base stations may be utilized, for example, in integrated access backhaul (IAB) networks.

Figure 5:
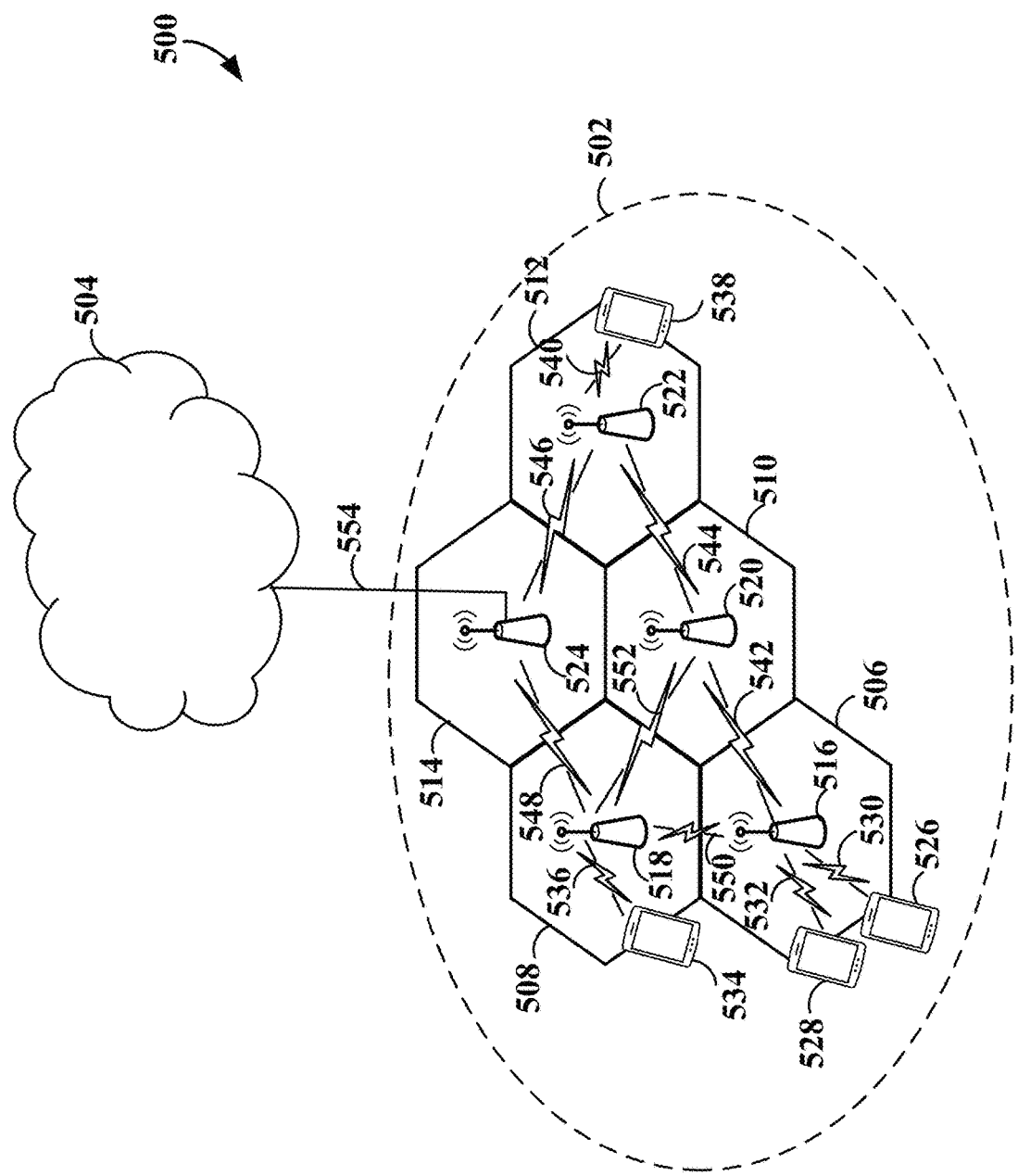
FIG. 5 is a diagram providing a high-level illustration of one example of a network configuration including an integrated access backhaul (IAB) network according to some aspects.

FIG. 5 is a schematic diagram providing a high-level illustration of one example of an IAB network configuration 500 according to some aspects. In this illustration, a communication network 502, such as an IAB network, is coupled to a remote network 504, such as a main backhaul network or mobile core network. In such an IAB network 502, the wireless spectrum may be used for both access links and backhaul links. In some examples, the wireless spectrum may utilize millimeter-wave (mmWave) or sub-6 GHz carrier frequencies.

The IAB network 502 may be similar to the radio access network 200 shown in FIG. 2, in that the IAB network 502 may be divided into a number cells 506, 508, 510, 512, and 514, each of which may be served by a respective IAB node 516, 518, 520, 522, and 524. Each of the IAB nodes 516-524 may be a base station (e.g., a gNB), or other node that utilizes wireless spectrum (e.g., the radio frequency (RF) spectrum) to support access for one or more UEs located within the cells 506-514 served by the IAB nodes.

In the example shown in FIG. 5, IAB node 516 communicates with UEs 526 and 528 via wireless access links 530 and 532, IAB node 518 communicates with UE 534 via wireless access link 536, and IAB node 522 communicates with UE 538 via wireless access link 540. The IAB nodes 516-524 are further interconnected via one or more wireless backhaul links 542, 544, 546, 548, 550, and 552. Each of the wireless backhaul links 542-552 may utilize the same wireless spectrum (e.g., the radio frequency (RF) spectrum) as the access links 530-540 to backhaul access traffic to/from the remote network 504. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any numbers of IAB nodes to form the IAB network 502.

In the example shown in FIG. 5, IAB node 516 communicates with IAB node 520 via wireless backhaul link 542, IAB node 520 communicates with IAB node 522 via wireless backhaul link 544, IAB node 522 communicates with IAB node 524 via wireless backhaul link 546, IAB node 524 communicates with IAB node 518 via wireless backhaul link 548, IAB node 518 communicates with IAB node 516 via wireless backhaul link 550, and IAB node 518 communicates with IAB node 520 via wireless backhaul link 552. As shown in FIG. 5, each IAB node 516-524 may be connected via respective wireless backhaul links 542-552 to two or more other IAB nodes for robustness.

Some or all of the IAB nodes 516-524 may also be connected via wired backhaul links (e.g., fiber, coaxial cable, Ethernet, copper wires, etc.) and/or microwave backhaul links Thus, the IAB network 502 may support both wired/microwave and wireless backhaul traffic. At least one of the IAB nodes (e.g., IAB node 524) may be a border IAB node, also referred to herein as an IAB donor node, that also provides a communication link 554 to the remote network 504. For example, the IAB donor node 524 may include a wired (e.g., fiber, coaxial cable, Ethernet, copper wires), microwave, or other suitable link 554 to the remote network 504.

To facilitate wireless communication between the IAB nodes 516-524 and between the IAB nodes 516-524 and the UEs served by the IAB nodes 516-524, each IAB node 516-524 may be configured to operate as both a scheduling entity and a scheduled entity. Thus, an IAB node (e.g., IAB node 516) may utilize the same wireless spectrum to transmit access traffic to/from UEs and to then backhaul that access traffic to/from the remote network 504. For example, to backhaul access traffic to/from IAB node 518, IAB node 518 may communicate with IAB node 520 to transmit backhaul access traffic via wireless backhaul link 542, IAB node 520 may communicate with IAB node 522 to transmit the backhaul access traffic via wireless backhaul link 544, and IAB node 522 may communicate with IAB node 524 to transmit the backhaul access traffic via wireless backhaul link 546. In this example, IAB nodes 520 and 522 may each operate as both a scheduling entity and a scheduled entity to backhaul access traffic to/from IAB node 516. As such, communication between a pair of IAB nodes may be individually scheduled by one of the IAB nodes within the pair.

In other examples, an IAB node may schedule wireless backhaul communications between other pairs of IAB nodes. For example, IAB node 524 may operate as the scheduling entity for the IAB network 502, while IAB nodes 516, 520, and 522 each operate as a scheduled entity to backhaul access traffic to/from IAB node 516. In this example, IAB node 524 may schedule wireless backhaul communications between each of the pairs of IAB nodes (e.g., between IAB node 516 and IAB node 520, between IAB node 520 and IAB node 522, and between IAB node 522 and IAB node 524). As another example, IAB node 522 may operate as a scheduling entity to schedule wireless backhaul communications between IAB nodes 516 and 520 and also between IAB node 520 and IAB node 522. IAB node 522 may then operate as a scheduled entity to allow IAB node 524 to schedule wireless backhaul communications therebetween.

Figure 6:
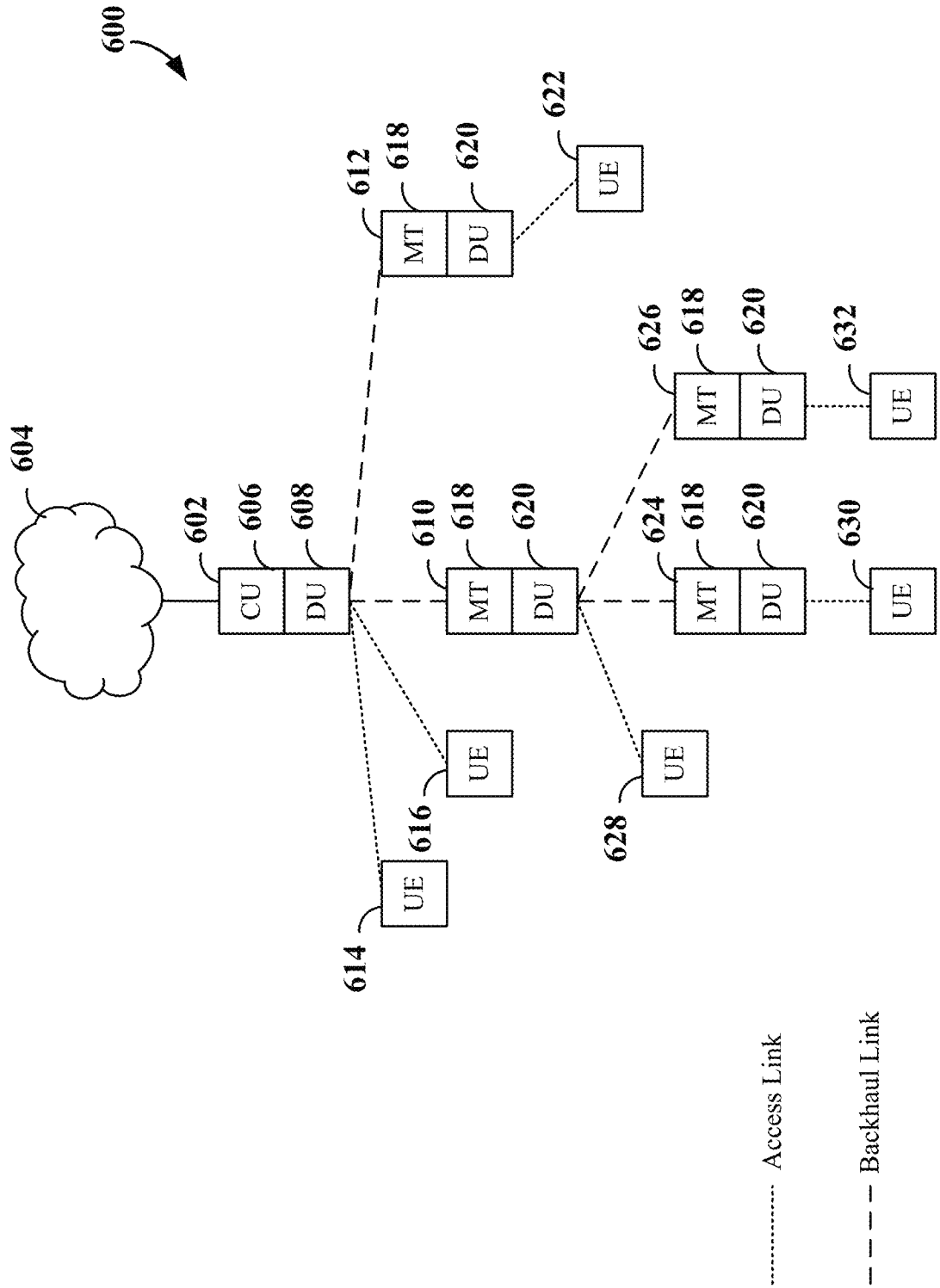
FIG. 6 is a diagram illustrating an example of IAB node functionality within an IAB network according to some aspects.

FIG. 6 is a schematic diagram illustrating an example of IAB node functionality within an IAB network 600. In the example shown in FIG. 6, an IAB node 602 is shown coupled to a core network 604 via a wireline connection. This IAB node 602 may be referred to herein as an IAB donor node, which may be, for example, an enhanced gNB including functionality for controlling the IAB network 600. In some examples, the IAB donor node 602 may include a central unit (CU) 606 and a distributed unit (DU) 608. The CU 606 is configured to operate as a centralized network node (or central entity) within the IAB network 600. For example, the CU 606 may include radio resource control (RRC) layer functionality and packet data convergence protocol (PDCP) layer functionality to control/configure the other nodes (e.g., IAB nodes and UEs) within the IAB network 600. Thus, the CU 606 can be configured to implement centralized mechanisms for handover decisions, topology changes, routing, bearer mapping, UE security, and other suitable services.

The DU 608 is configured to operate as a scheduling entity to schedule scheduled entities (e.g., other IAB nodes and UEs) of the IAB donor node 602. For example, the DU 608 of the IAB donor node 602 may operate as a scheduling entity to schedule IAB nodes 610 and 612 and UEs 614 and 616. Thus, the DU 608 of the IAB donor node 602 may schedule communication with IAB nodes 610 and 612 via respective backhaul links and schedule communication with UEs 614 and 616 via respective access links In some examples, the DU 608 may include the radio link control (RLC), medium access control (MAC), and physical (PHY) layer functionality to enable operation as a scheduling entity.

Each of the IAB nodes 610 and 612 may be configured as a Layer 2 (L2) relay node including a respective DU 620 and a mobile termination (MT) unit 618 to enable each L2 relay IAB node 610 and 612 to operate as a scheduling entity and a scheduled entity. For example, the MT unit 618 within each of the L2 relay IAB nodes 610 and 612 is configured to operate as a scheduled entity that may be scheduled by the IAB donor node 602. Each MT unit 618 within the L2 relay IAB nodes 610 and 612 further facilitates communication with the IAB donor node 602 via respective backhaul links. In addition, the DU 620 within each of the L2 relay IAB nodes 610 and 612 operates similar to the DU 608 within the IAB donor node 602 to function as a scheduling entity to schedule one or more respective scheduled entities (e.g., other IAB nodes and/or UEs) of the L2 relay IAB nodes 610 and 612.

For example, the DU 620 of L2 relay IAB node 612 functions as a scheduling entity to schedule communication with a UE 622 via an access link, while the DU 620 of L2 relay IAB node 610 functions as a scheduling entity to schedule communication with the MT units 618 of L2 relay IAB nodes 624 and 626 via respective backhaul links and a UE 628 via an access link Each of the L2 relay IAB nodes 624 and 626 further includes a respective DU 620 that functions as a scheduling entity to communicate with respective UEs 630 and 632.

In the network topology illustrated in FIG. 6, the IAB donor node 602, in combination with each of the L2 relay IAB nodes 610, 612, 624 and 626, can collectively form a disaggregated base station (e.g., a disaggregated gNB). The disaggregated base station includes the CU 606 and each of the DUs 608 and 620 controlled by the CU 606. The CU/DU functional split in disaggregated base stations can facilitate the realization of time-critical services, such as scheduling, retransmission, segmentation, and other similar services in the DU 608/620. The less time-critical functionalities may be centralized and resource-pooled in the CU 606, even if non-ideal backhaul is used between the CU and DU. An additional benefit of the CU/DU separation is that external interfaces of the gNB, such as Xn are terminated in the CU, thus avoiding the extra complexity of terminating external interfaces to every DU. The Xn interface may operate as the network interface between RAN nodes and can provide connectivity between gNB-to-gNB, gNB-to-eNB and between eNB-to-eNB. The CU/DU split also supports centralized termination of the PDCP, which facilitates both the security protection of UE communication end-to-end (E2E) between the UE and the CU, as well as the packet handling for dual connectivity and handover between the different DUs of the disaggregated base station, since the traffic flows to/from different DUs are separated at the CU. It should be understood that disaggregated base stations may be implemented within networks other than IAB networks, and the present disclosure is not limited to any particular type of network.

As discussed above, a gNB may be configured as a single logical node (e.g., aggregated base station) or it may include a central unit (CU) and one or more distributed unit(s) (DU(s)) in a disaggregated base station configuration. The CU and the DU(s) it controls are connected via an F1 interface. The F1 application protocol (F1-AP) is used for conveying the lower-layer configuration information of the radio bearers between the CU and DU, as well as the setting up of a generic tunneling protocol (GTP) tunnel between the DU and CU for each radio bearer.

As further discussed above, an IAB node's protocol stack may include two portions, the mobile termination (MT) part (e.g., 618), which is used to communicate with a parent node, and a distributed unit (DU) part (e.g., 620), which is used to communicate with a child IAB node or a normal UE, where hop-by-hop RLC may be used between the IAB nodes. Multi-hop forwarding may be performed via IAB-specific backhaul adaptation protocol (BAP). During operation, an IAB donor may assign a unique L2 address (BAP address) to each IAB node that it controls. In the case of multiple paths, multiple route IDs can be associated to each BAP address. The BAP of the origin node (IAB donor DU for the DL traffic, and the L2 relay IAB node for the UL) may add a BAP header to packets they are transmitting, which will include a BAP routing ID (e.g., BAP address of the destination/source IAB node and an optional path ID). Each IAB node may have a routing table (configured by the IAB donor node CU 602) containing the next hop identifier for each BAP routing ID. Separate routing tables may be kept for the DL and UL direction, where the DL table is used by the DU part of the IAB node, while the MT part of the IAB node uses the UL table.

Backhaul (BH) RLC channels may be used for transporting packets between IAB nodes (or between an IAB donor DU and an IAB node). When it comes to the mapping between UE radio bearers and backhaul RLC channels, a plurality of mappings are supported, such as N:1 and 1:1 mapping. The N:1 mapping multiplexes several UE radio bearers onto a single BH RLC channel based on specific parameters, such as QoS profile of the bearers. The N:1 is designed to optimize use of BH RLC channels and requires less signaling overhead as a small number of BH RLC channels need to be established. The 1:1 mapping, on the other hand, maps each UE radio bearer onto a separate BH RLC channel.

Prior to becoming fully operational, an IAB node may execute an IAB integration procedure. The IAB node may initially connect to the network by using its MT function to execute the initial access procedure for regular UEs. The reuse of the legacy UE initial access procedure is in line with the principle of minimizing the impact on the core network. Next, the IAB donor node may establish one or more BH RLC channels at one or more intermediate hops towards the newly-joining IAB node, for example, to setup a certain number of default BH RLC channels between the new IAB node and its parent that could be used for N:1 mapping, BH RLC channel for F1-AP traffic of the DU part of the IAB node, and so forth. The IAB donor node may also update the routing tables at intermediate hops, in order to enable the routing towards the IAB node. Furthermore, the newly-established BH RLC connectivity may be used to carry the F1-AP control signaling used to configure the DU function of the IAB node. Once the IAB-DU function has been set up, the IAB node can serve regular UEs, similar to any other DU.

Figure 7:
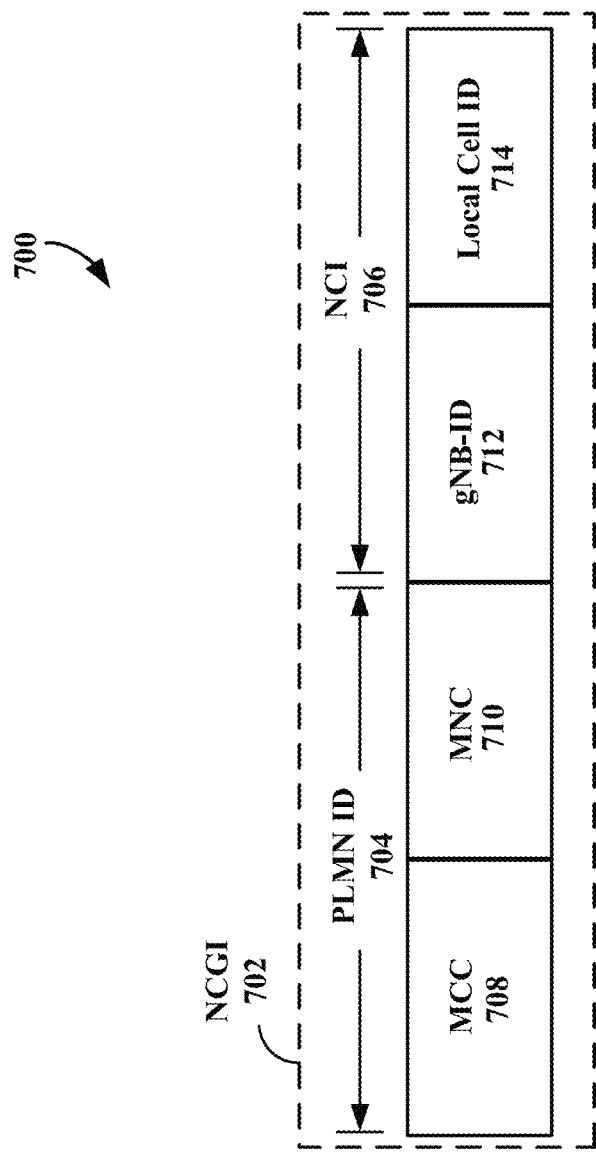
FIG. 7 is a diagram illustrating an example of a NR Cell Global Identity signal according to some aspects.

FIG. 7 is a diagram 700 illustrating an example of a NR Cell Global Identity signal (NCGI) 702 according to some aspects. The NCGI 702 may be configured as an identifier of a NR cell at an IAB donor DU or IAB-node DU (see, e.g., 1012, 1018, below), and may include a concatenation of Public Land Mobile Network (PLMN) ID 704 and a NR Cell Identity (NCI) 706. In some examples, the PLMN ID 704 may be configured as a 24-bit identification that includes a mobile country code (MCC) 708, which may be 12 bits, and a mobile network code (MNC) 710, which may also be 12 bits. In some examples, the NCI 706 may be configured as a 36-bit identification with a gNB Identifier (gNB ID) 712, which may occupy the leftmost 22-32 bits, and a local cell ID 714 occupying the remaining bits. In some examples, the gNB-ID may be configured to be unique within a gNB, thus making the gNB -ID common for all cells (e.g., at IAB donor DUs and IAB-node DUs) served by the gNB (e.g., with one IAB donor CU). Similarly, the PLMN ID together with the gNB-ID may be used to identify a gNB.

In some examples, a Physical Cell Identifier (PCI) may be used, where the PCI serves as an ID for a cell, having up to 1008 supported values for a NR system. The PCI can be reused by multiple geographically separated cells in a network, and cells with the same PCI may be distinguished by their unique cell global identifiers (e.g., NCGI). The PCI may be carried by PSS/SSS in an SSB block, and the PCI may be used to determine one or more scrambling sequences of different physical signals/channels. For some channel types, such as PBCH, PDCCH CoreSet 0, and/or cell-specific PDSCH transmission, only the PCI may be used as a scrambling seed. For other channels, a configured scrambling seed can also be used alternately or in addition to the PCI.

In some examples, cell information may be exchanged via the Xn interface, where a first gNB may provide a second gNB information on a cell served by the first gNB over Xn using a served cell information element (IE). A first gNB can further update a list of served cells provided to the second gNB over Xn by adding, modifying, and/or deleting cells on the list. For modification or deletion, the cells may be indicated by their existing NCGIs. A first gNB can request information over Xn from a second gNB about a cell served by the second gNB using the cell assistance information IE, after which the second gNB will send served cell information for the requested cells. Here, when requesting cell information, two options may be available. In a first option, the first gNB may request a full list of served cells by the second gNB using, for example, a Complete Information Request Indicator. Under a second option, the first gNB may request a limited list of served cells by providing their NCGIs.

Figure 8:
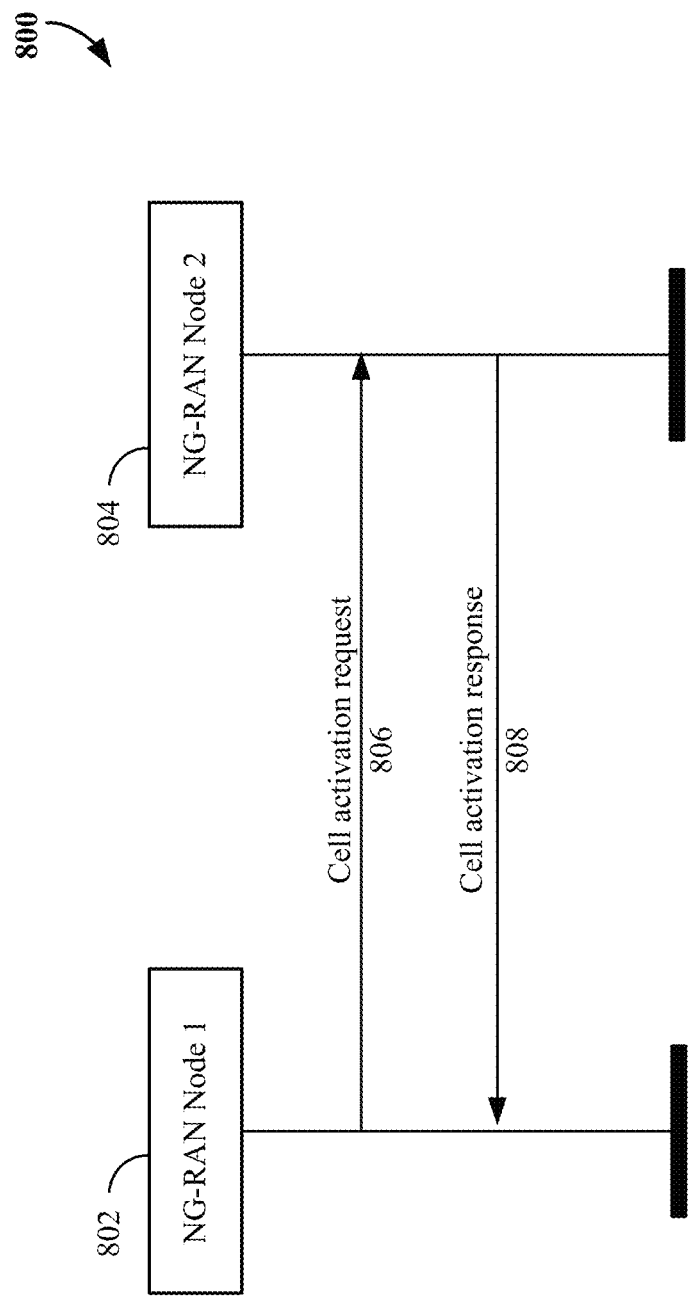
FIG. 8 is a diagram illustrating a cell activation between two nodes over an Xn link according to some aspects.

FIG. 8 is a diagram 800 illustrating a cell activation between two nodes over an Xn link according to some aspects. During operation, a gNB (RAN node) may switch off a cell served by an associated IAB node to conserve power. In the example of FIG. 8, a first gNB 802 (NG-RAN Node 1) may initiate a cell activation procedure towards a second gNB 804 (NG-RAN Node 2) in which the first gNB 802 transmits a cell activation request 806 to the second gNB 804 to activate one or more cells, previously reported as inactive. The gNB 802 may be configured as an IAB donor node (which includes a CU and one or more DUs that may be co-located and/or distributed), and the gNB 804 may be configured as an aggregated base station or another IAB donor node (e.g., another disaggregated base station). In some examples, the first gNB may indicate which served cells are to be activated by using the NCGIs of the requested cells. The second gNB 804 responds to the cell activation request 806 by transmitting a cell activation response 808, indicating activation status of the requested cells. Deactivation may be performed similarly, and may be indicated by the gNB 802 to other gNBs, together with the Served Cell Information using a Deactivation Indication signal.

Figure 9:
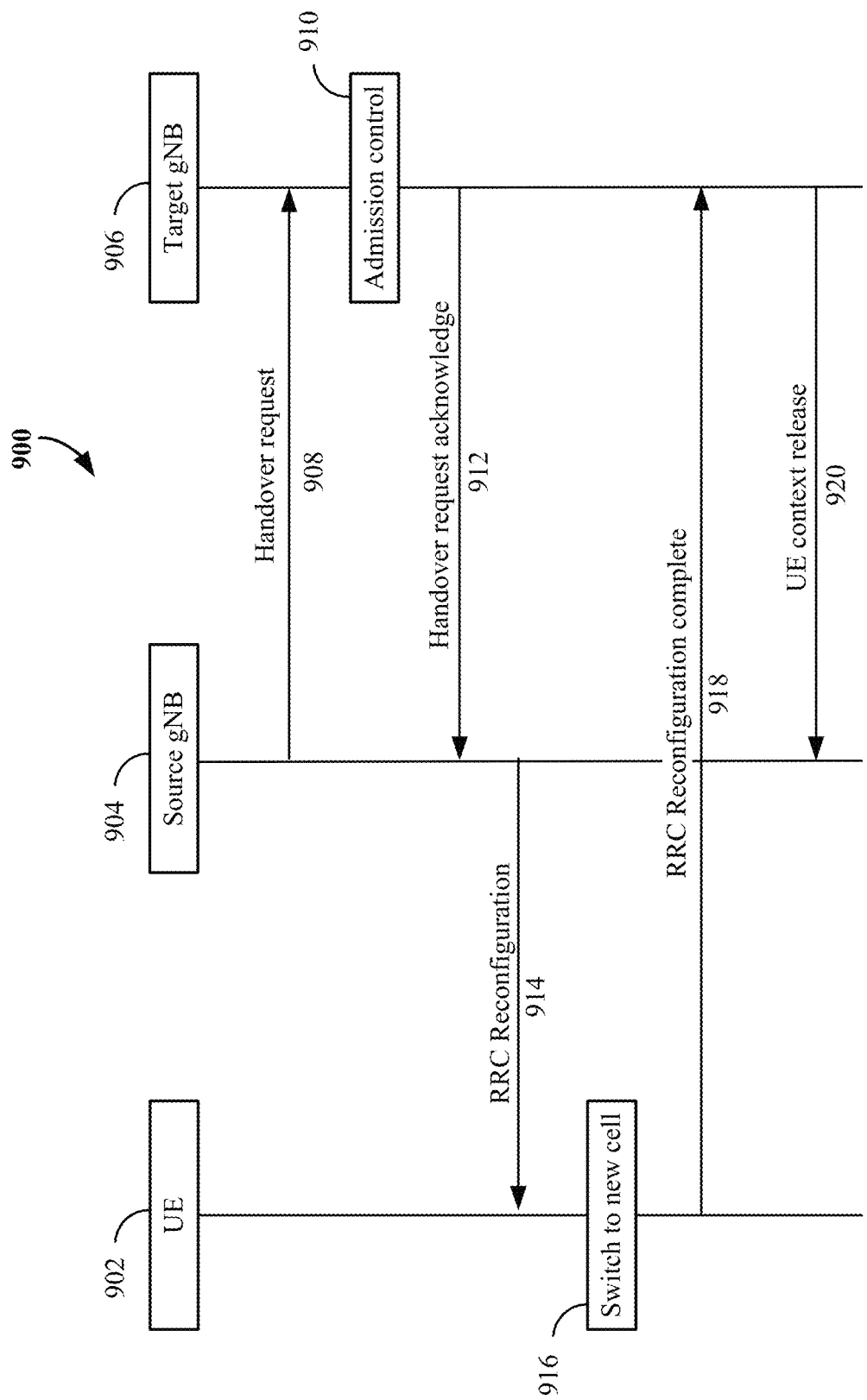
FIG. 9 is a diagram illustrating a high-level example of an inter-gNB handover according to some aspects.

FIG. 9 is a diagram 900 illustrating a high-level example of an inter-gNB handover of an IAB donor node according to some aspects. This example shows a source gNB 904 requesting handover of a UE 902 to a target gNB 906, where a handover request signal 908 is transmitted over the Xn interface to the target gNB 906. The target gNB 906 performs admission control in block 910 and provides a new RRC configuration as part of the handover request acknowledge signal 912. The source gNB 904 provides the RRC configuration to the UE by forwarding an RRC reconfiguration signal 914 received in the handover request acknowledge signal 912. After receiving the RRC reconfiguration signal 914, the UE 902 switches to the new cell in block 916, moves the RRC connection to the target gNB 906, and replies with the RRC reconfiguration complete signal 918, as shown in the figure. The target gNB 906 then transmits the UE context release signal 920 to the source gNB 904 to inform the source gNB 904 of the successful handover.

Figure 10:
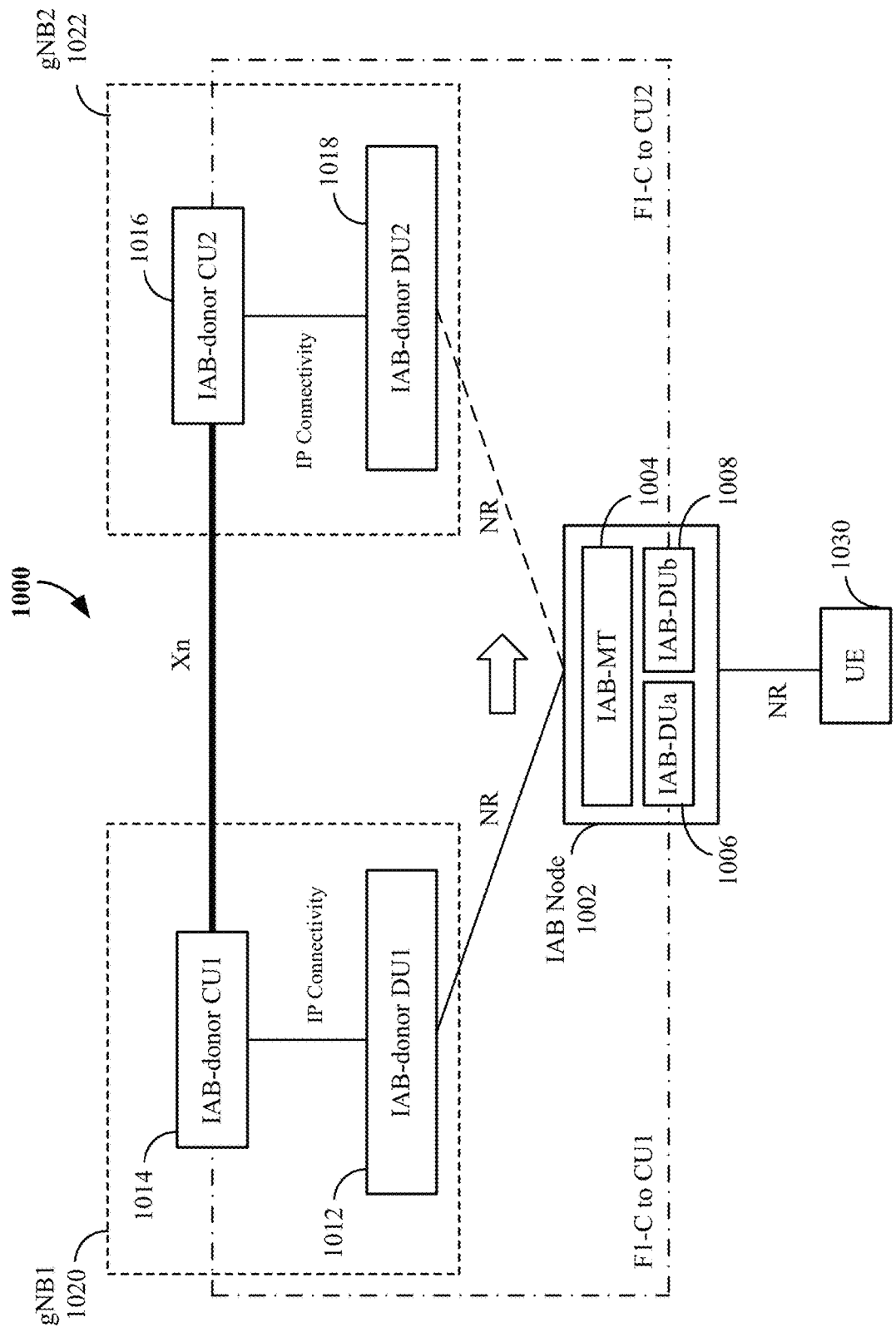
FIG. 10 is a diagram illustrating a migration of an IAB node from one IAB donor to another IAB donor according to some aspects.

FIG. 10 is a diagram 1000 illustrating a migration of an IAB node from a first IAB donor node 1014 to a second IAB donor node 1016 according to some aspects. The diagram 1000 may be part of an IAB network, such as the ones described above in connection with FIGS. 5-6 and 8-9. In this example, an IAB node 1002 (e.g., an L2 relay IAB node) is being migrated from a first gNB 1020, represented by IAB donor CU1 1014 and associated IAB donor DU1 1012, to a second gNB 1022, represented by IAB donor CU2 1016 and associated IAB donor DU2 1018. The IAB node 1002 is configured with mobile termination functionality via IAB-MT 1004 and distributed unit functionality via IAB-DUa 1006 and IAB-DUb 1008. In should be understood by one skilled in the art that IAB-DUa 1006 and IAB-DUb 1008 are shown as separate entities in the figure for the purposes of logical illustration, and that IAB-DUa 1006 and IAB-DUb 1008 may also be configured as a single entity during operation. The IAB node 1002 may be connected to one or more child nodes or devices, depicted as UE 1030 in the figure.

IAB donor CU1 1014 may communicate with IAB donor CU2 1016 via an Xn interface. The IAB donor CU1 1014 may be coupled to the IAB donor DU1 1012 via an IP connectivity interface. Similarly, the IAB donor CU2 1016 may be coupled to the IAB donor DU2 1018 via a separate IP connectivity interface, as shown in the figure. IAB donor CU1 1014 may also be coupled to IAB-DUa 1006 via an F1 control (F1-C) interface and to IAB-DUb 1008 via a separate F1-C interface.

During operation, migration of IAB-node MT 1004 from IAB donor CU1 1014 to IAB donor CU2 1016 also requires also a migration of the IAB-DUa 1006 and IAB-DUb 1008. Migration of the IAB-DUa 1006 and IAB-DUb 1008 to IAB donor CU2 1016 requires a change of the NCGI and potentially the Physical Cell Identifier (PCI) of the cells served by IAB-DUa 1006 (e.g., 1020) and the cells served by IAB-DUb 1008. Further, both IAB donor CU1 1014 and IAB donor CU2 1016 should have knowledge of the new NCGI (e.g., 702) to transfer child UEs/MTs of the migrating IAB-node 1002 from IAB donor CU1 1014 to IAB donor CU2 1016. In some examples, the PCI of the migrated IAB-DUa 1006 may be broadcast on the air interface (NR) before the child UEs/MTs (e.g., 1030) can be migrated. Similarly, the PCI of the migrated IAB-DUb 1008 may be broadcast before the child UEs/MTs of IAB-DUb 1008 can be migrated. The change of NCGIs/PCIs from IAB donor CU1 1014 to IAB donor CU2 1016 may be communicated over the Xn interface as illustrated in the figure. In some examples, IAB donor CU1 1014 may indicate the cells on the migrated IAB-DUa 1006 (and IAB-DUb 1008) to IAB donor CU2 1016 using an identifier of the IAB -node 1002 when IAB donor CU1 1014 does not yet know the NCGIs of these cells.

In some examples, IAB donor CU1 1014 may establish a first signaling connection to IAB node 1002 and be configured to have the IAB donor DU1 1012 provide a first cell configuration associated with the first IAB donor CU1 1014 to the second IAB donor CU2 1016 on a base station interface Xn (which may alternately be an X2 interface), indicating the one or more cells that are served by the IAB-DUa 1006. The first signaling connection may be realized using F1-C or RRC, and the base station interface may be a Xn or X2 interface. The first cell configuration represents one or more cells activated on the IAB-DUa 1006 of the IAB-node 1002 by the first IAB donor CU1 1014. The cell configuration may include, but is not limited to, NCGI data that carries an identifier (gNB-ID) of the first IAB donor, PCI data, an activation status, and/or cell information. The cell information may include, but is not limited to, a PLMN ID, an area code, a frequency or bandwidth, a cell direction, a cell size, a cell mode (e.g., TDD, FDD), a TDD configuration, a measurement timing configuration, cell access information (e.g., barred cell), and/or connectivity support information (e.g. EN-DC).

The IAB donor CU1 1014 may further provide a second cell configuration (to-be-migrated configuration) of another DU (IAB-DUb 1008) of the IAB-node 1002 to the second IAB donor CU2 1016, where the second cell configuration is for one or more cells of the IAB-DUb 1008 associated with the first IAB donor CU1 1014. The first IAB donor CU1 1014 may derive the second cell configuration from the first cell configuration, for example, by mapping NCGIs. In some examples, the first IAB donor CU1 1014 may receive the second cell configuration from the IAB-node 1002 on the first signaling connection (e.g., via F1-C or RRC). In some examples, the second IAB donor CU2 1016 may receive the second cell configuration from the IAB-node 1002 on a second signaling connection (e.g., F1-C or RRC) established with the IAB-node.

In some examples, the second IAB donor CU2 1016 may derive the second cell configuration from the first cell configuration that it either receives from the first IAB donor CU1 1014 on the base station interface (e.g., Xn or X2 interface) or from the IAB-node 1002 on the second signaling connection (e.g., F1-C or RRC). The second cell configuration may be derived, for example, using cell mapping, PCI change (to avoid PCI collision), or existing PCI (i.e., no PCI change to minimize service disruption at child UEs/MTs). In some examples, the second IAB donor CU2 1016 may provide a mapping between the first cell configuration and second cell configuration to the first IAB donor CU1 1014 using, for example, mapping of NCGIs, PCIs. In some examples, the second IAB donor CU2 1016 may send the second cell configuration to the IAB-node 1002 on the second signaling connection (e.g., F1-C or RRC) once it receives or derives the second cell configuration. The second IAB donor CU2 1016 may also indicate a mapping between the first and second cell configuration to the IAB-node 1002.

The first IAB donor CU1 1014 may request the IAB donor DU1 1012 to send the second cell configuration to the IAB node 1002 on the first signaling connection. In some examples, the first IAB donor CU1 1014 may also provide a mapping between the first cell configuration and second cell configuration to the second IAB donor CU2 1016, for example, via the mapping of NCGIs.

The first IAB donor CU1 1014 may indicate that the first or second cell configuration is for one or more cells served by a DU (e.g., IAB-DUa 1006, IAB-DUb 1008) by transmitting the configuration within a handover preparation, secondary node (SN) addition preparation, SN modification, or SN change (that may include a third master node) of the IAB-MT 1004, where the first IAB donor CU1 1014 is configured as a source donor, a master node or a source SN. The first IAB donor CU1 1014 may indicate to the second IAB-donor CU2 1016 that the first cell configuration is associated with one or more cells served by IAB-DUa 1006 and the second cell configuration is associated with one or more cells served by IAB-DUb 1008 by including an identifier of the IAB-MT 1004 on the base station interface (e.g., Xn or X2interface). The identifier may be configured as an NG-RAN node UE application protocol ID reference used for the IAB-node 1002 MT-associated messaging between the first IAB donor CU1 1014 and the second IAB donor CU2 1016 on the base station interface (e.g., Xn or X2 interface). In some examples, the identifier of the IAB-MT 1004 could be configured as IP address information or BAP address information allocated by the IAB-donor CU2 1016 to the IAB-node MT 1004. These identifiers of the IAB-MT 1004 may be sent by the IAB-node 1002 to the first IAB donor CU1 1014 or requested by the first IAB donor CU1 1014 on the first signaling connection (e.g., F1-C or RRC).

In some examples, the second IAB donor CU2 1016 may provide the first IAB donor CU1 1014 with the second cell configuration of a DU (e.g., IAB-DUb 1008) of the IAB-node 1002 associated with the second IAB donor CU2 1016. The second cell configuration information may be provided, for example, within a handover preparation message, SN addition preparation message, SN modification message, or SN change message of the IAB-MT 1004. Here, the second IAB donor CU2 1016 is configured as a target donor, a SN, or a target SN. In some examples, the second IAB donor CU2 1016 may send the first and/or second cell configuration and include an identifier of the IAB-MT 1004 as discussed above to indicate that the configuration is for one or more cells served by an IAB-node DU associated with the IAB-MT 1004.

In some examples, the first IAB donor CU1 1014 can request the second IAB donor CU2 1016 to transmit the second cell configuration by providing an identifier of the IAB-MT 1004. The first IAB donor CU1 1014 can also request the second IAB donor CU2 1016 to activate cells on an IAB-node DU (e.g., 1006, 1008) by providing an identifier of a co-located IAB-MT 1004. In some examples, the first IAB donor CU1 1014 may use the second cell configuration in subsequent handover requests (or SN addition, SN change) to the second IAB donor CU2 1016 of child/descendant UEs/MTs of the IAB-DUb 1008. For example, the first IAB donor CU1 1014 may indicate to the second IAB donor CU2 1016 the target NCGI on the IAB-DUb 1008 of the IAB-node 1002 as received in the second cell configuration.

Figure 11:
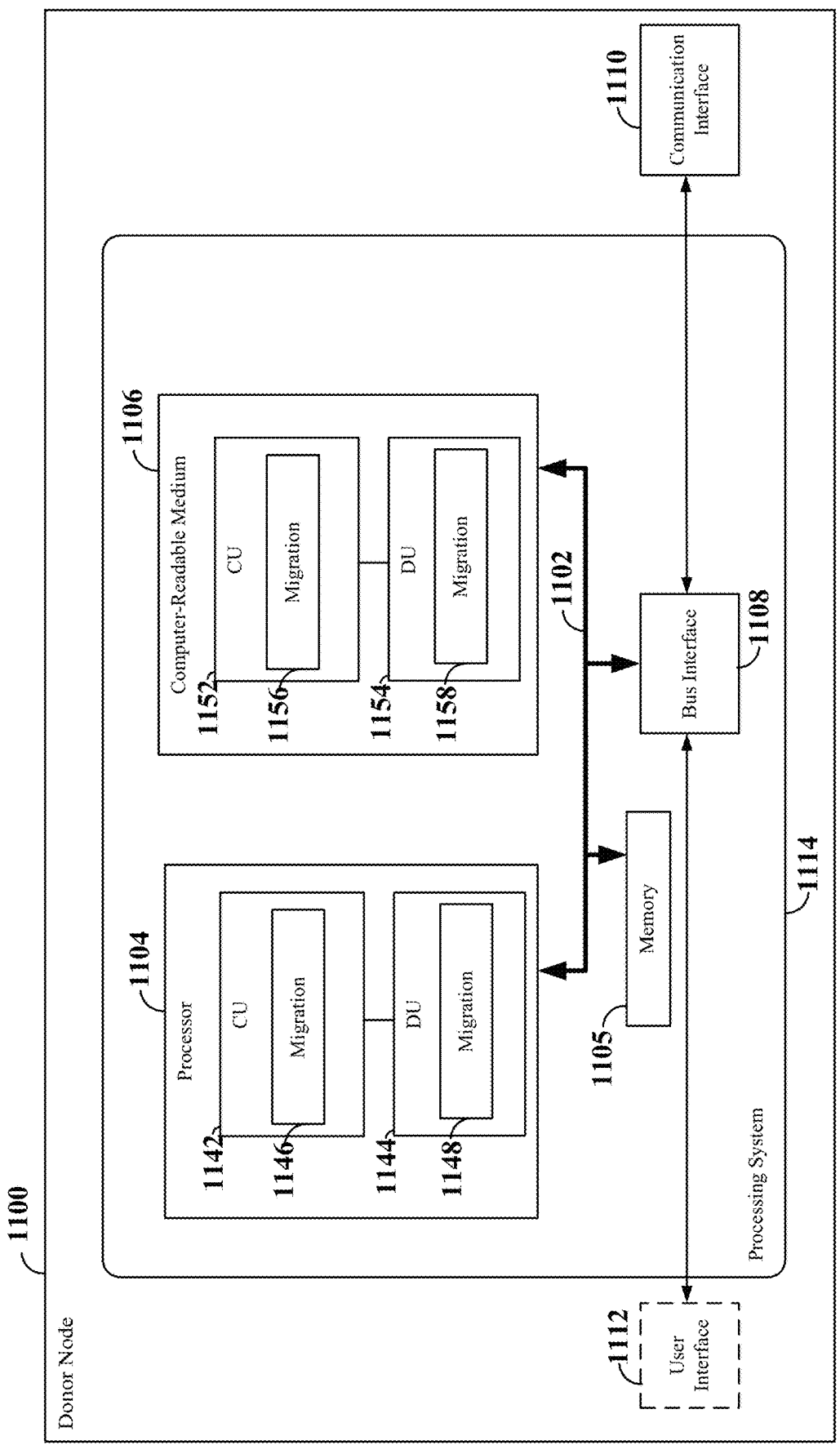
FIG. 11 is a block diagram illustrating an example of a hardware implementation for an IAB node employing a processing system according to some aspects.

FIG. 11 is a block diagram illustrating an example of a hardware implementation for a donor node 1100 employing a processing system 1114. For example, the donor node 1100 may be an IAB donor node (e.g., 1014, 1016), or other RAN node (e.g., base station, such as a gNB) forming at least a part of a disaggregated base station, as illustrated in any one or more of FIGS. 9-13.

The donor node 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1100 may be configured to perform any one or more of the functions described herein. That is, the processor 1104, as utilized in a donor node 1100, may be used to implement any one or more of the processes and procedures described herein.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a communication interface 1110. The communication interface 1110 provides one or more communication interfaces or means for communicating with various other apparatus over a transmission medium (e.g., air, wire) over a plurality of communications interfaces (e.g., Xn, F1-C). Depending upon the nature of the apparatus, a user interface 1112 (e.g., keypad, display, speaker, microphone, joystick, touchscreen) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described herein for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. In examples in which the RAN node 1100 is an IAB donor node, the processor 1104 may include central unit (CU) circuitry 1142 and distributed unit (DU) circuitry 1144. In examples in which the RAN node 1100 is an L2 relay IAB node, the processor 1104 may only include the DU circuitry 1144 (e.g., the CU circuitry 1142 is omitted in this example). The CU circuitry 1142 may further be configured to execute CU software 1152 included on the computer-readable medium 1106 to implement one or more of the functions described herein. In addition, the DU circuitry 1144 may further be configured to execute DU software 1154 included on the computer-readable medium 1106 to implement one or more of the functions described herein.

The CU circuitry 1142 may further include migration circuitry 1146 that may be configured to execute migration software 1156 included in CU software 1152 of computer-readable medium 1152. The DU circuitry 1144 may include migration circuitry 1148 that may be associated with migration circuitry 1146 of the CU circuitry 1142, and be configured to execute migration software 1158 included in the DU software of 1154 computer-readable medium 1106. In some examples, the migration circuitry 1146 is configured to receive and process cell configuration data and cell information data relating to an IAB node (e.g., 1002), as described above in connection with FIG. 10 for migration purposes. The cell configuration may include, but is not limited to, NCGI data that carries an identifier (gNB-ID) of an IAB donor (e.g., 1014), PCI data, an activation status, and/or cell information. The cell information may include, but is not limited to, a PLMN ID, an area code, a frequency or bandwidth, a cell direction, a cell size, a cell mode (e.g., TDD, FDD), a TDD configuration, a measurement timing configuration, cell access information (e.g., barred cell), and/or connectivity support information (e.g., Evolved-Universal Terrestrial Radio Access New Radio dual connectivity (EN-DC)). The migration circuitry 1146 may further be configured to derive cell configurations and perform mapping functions (e.g., mapping of NCGIs) as described above, and may provide connectivity data for migrating an IAB node (e.g., 1002) from one IAB donor node (e.g., gNB) to another IAM donor node in an IAB network.

Figure 12:
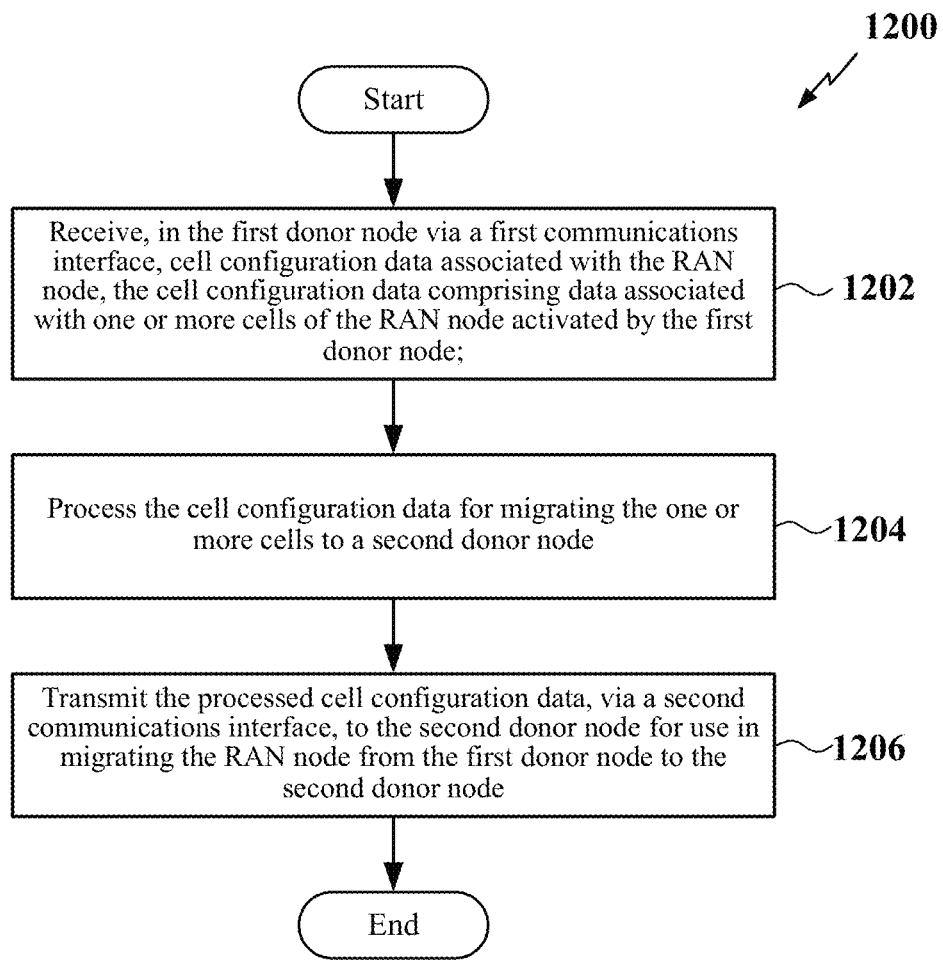
FIG. 12 is a flow chart illustrating a process for migrating a RAN node from a first donor node to a second donor node according to some aspects.

FIG. 12 is a flow chart illustrating a process 1200 for migrating a RAN node from a first donor node to a second donor node in a wireless communication network according to some aspects. In some examples, the communications network may include an IAB network. As described below, some or all illustrated features may be omitted in a particular implementation within the scope of the present disclosure, and some illustrated features may not be required for implementation of all examples. In some examples, the method may be performed by the donor node 1100, as described above and illustrated in FIG. 11, by a processor or processing system, or by any suitable means for carrying out the described functions.

In block 1202, the donor node (e.g., a first donor node) may receive via a first communications interface (e.g., F1-C or RRC interface) cell configuration data associated with a RAN node (e.g., 1002), the cell configuration data including data associated with one or more cells of the RAN node activated by the first donor node. The cell configuration data may include, but is not limited to, one or more of a NR Cell Global Identity (NCGI) including an identifier (gNB-ID) of the first donor node, PCI data, an activation status, and/or cell information. The cell information may include one or more of a Public Land Mobile Network (PLMN) ID, an area code, a frequency or bandwidth, a cell direction, a cell size, a cell mode, a time-division duplex (TDD) configuration, a measurement timing configuration, cell access information, and/or connectivity support information. In some examples, the first communications interface is one of a F1 control (F1-C) interface or a radio resource control (RRC) interface. In some examples, the first donor node includes a source Integrated Access and Backhaul (IAB) donor node. In some examples, the first donor node includes a first IAB donor node and the second donor node includes a second IAB donor node For example, the processing circuitry 1104, together with the communication interface 1110, shown and described above in connection with FIG. 11 may provide a means to receive cell configuration data.

In block 1204, the first donor node processes the cell configuration data for migrating the one or more cells to a second donor node. For example, the CU circuitry 1142 and DU circuitry 1144, shown and described above in connection with FIG. 11 may provide a means to process cell configuration data.

In block 1206, the first donor node transmits the processed cell configuration data, via a second communications interface, to the second donor node for use in migrating the RAN node from the first donor node to the second donor. In some examples, the second communications interface may be configured as an Xn or X2 interface. The processed cell configuration data may be transmitted as a handover preparation message, a secondary node addition preparation message, a secondary node modification message or a secondary node change message. In some examples, the CU circuitry 1142 and the DU circuitry 1144, together with the communication interface 1110 described above in connection with FIG. 11 may provide a means to transmit the processed cell configuration data to a second donor node for use in migrating the RAN node from the first donor node to the second donor.

Figure 13:
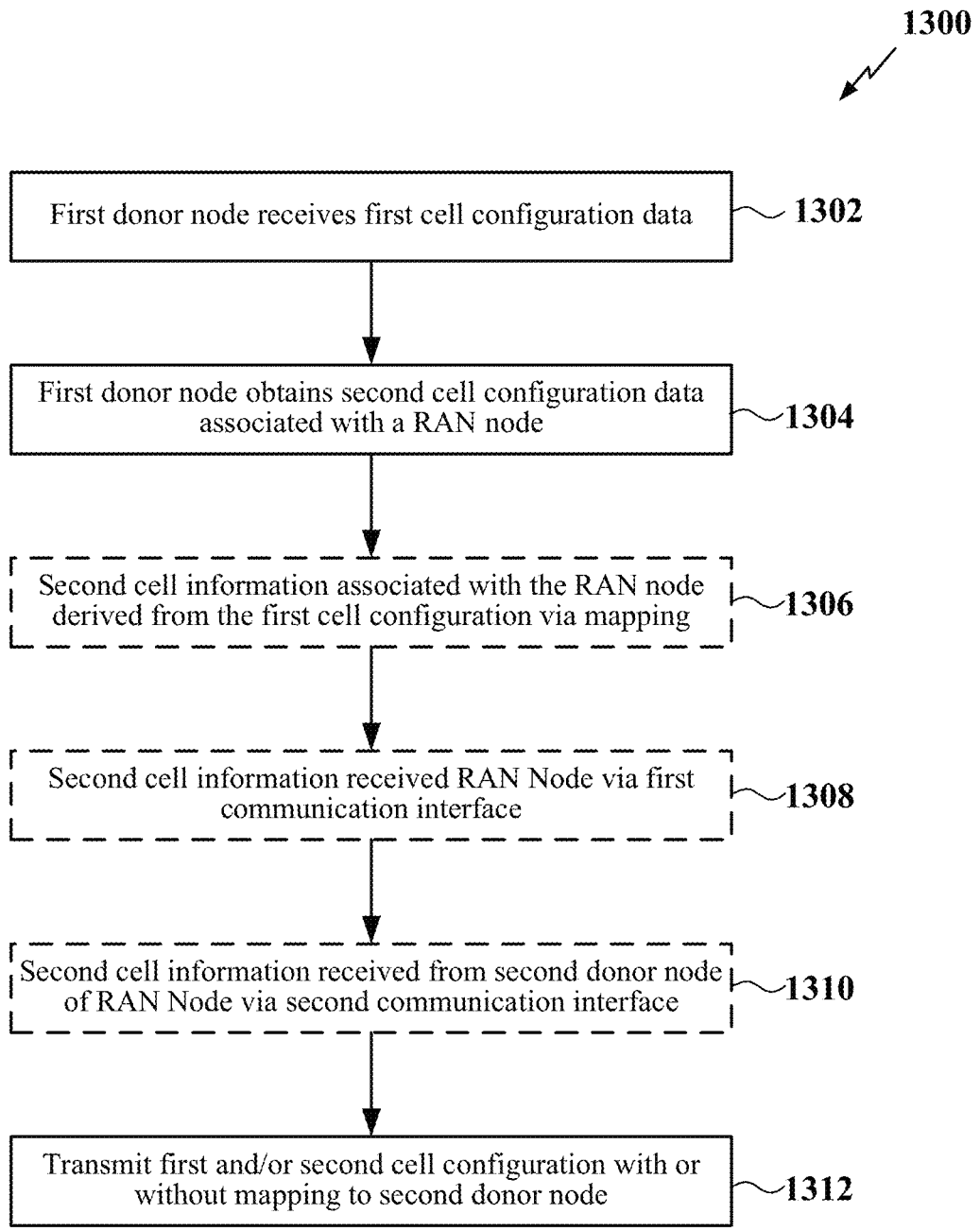
FIG. 13 is a flow chart illustrating another process for migrating a RAN node from a first donor node to a second donor node according to some aspects.

FIG. 13 is a flow chart illustrating another process 1300 for migrating a RAN node from a first donor node to a second donor node according to some aspects. As described below, some or all illustrated features may be omitted in a particular implementation within the scope of the present disclosure, and some illustrated features may not be required for implementation of all examples. In some examples, the method may be performed by the donor node 1100, as described above and illustrated in FIG. 11, by a processor or processing system, or by any suitable means for carrying out the described functions.

In block 1302, a first donor node (e.g., 1020) receives first cell configuration data, which may be similar data to cell configuration data described above in connection with FIG. 10. For example, the first donor node may receive via a first communications interface (e.g., F1-C or RRC interface) first cell configuration data associated with a RAN node (e.g., 1002), the cell configuration data including data associated with one or more cells of the RAN node activated by the first donor node. For example, the processing circuitry 1104, together with the communication interface 1110, shown and described above in connection with FIG. 11 may provide a means to receive the first cell configuration data.

In block 1304, the first donor node may obtain second cell configuration data associated with the RAN node (e.g., 1002). The second cell configuration data includes data associated with one or more cells of the RAN node activated by the first donor node. With regards to obtaining the second cell configuration data, the process 1300 illustrates three alternative processes, shown in dotted lines in the figure. In block 1306, the second cell configuration data associated with the RAN node may be derived in the first donor node from the first cell configuration data via mapping between the first cell configuration data and the second cell configuration data, discussed above. Alternately in block 1308, the second cell configuration associated with the RAN node data may be obtained via the first communications interface (e.g., (e.g., F1-C or RRC)). In another alternative, the second cell configuration data associated with the RAN node may be received via a second communications interface (e.g., Xn, X2) as shown in block 1310. For example, the processing circuitry 1104, together with the communication interface 1110, shown and described above in connection with FIG. 11 may provide a means to receive the second cell configuration data.

In block 1312, the first donor node transmits the first and/or second cell configuration with or without mapping data to the second donor node. For example, the first donor node may transmit the second cell configuration data via the second communications interface to the second donor node for use in migrating the RAN node from the first donor node to the second donor node. In some examples, the CU circuitry 1142, the DU circuitry 1144, together with the communication interface 1110 described above in connection with FIG. 11 may provide a means to receive and process cell configuration data, map and/or transmit the processed cell configuration data to a second donor node for use in migration.

In one configuration, the donor nodes (e.g., DU and/or CU of the IAB base stations) include various means as described in the present disclosure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable medium 1106, or any other suitable apparatus or means described in any one of the FIGS. 1-2, 4-6 and 8-11, and utilizing, for example, the processes and/or algorithms described herein in relation to FIGS. 12 and 13.

The processes shown in FIGS. 12-13 may include additional aspects, such as any single aspect or any combination of aspects described below and/or in connection with one or more other processes described elsewhere herein.

Aspect 1: A method of migrating a radio access network (RAN) node associated with a first donor node in a communications network, comprising: receiving, in the first donor node via a first communications interface, cell configuration data associated with the RAN node, the cell configuration data comprising data associated with one or more cells of the RAN node activated by the first donor node; processing the cell configuration data for migrating the one or more cells to a second donor node; and transmitting the processed cell configuration data, via a second communications interface, to the second donor node for use in migrating the RAN node from the first donor node to the second donor node.

Aspect 2: The method of aspect 1, wherein the first communications interface is one of a F1 control (F1-C) interface or a radio resource control (RRC) interface; and the second communications interface is one of an Xn interface or an X2 interface.

Aspect 3: The method of aspects 1 or 2, wherein the first donor node comprises a source Integrated Access and Backhaul (IAB) donor node.

Aspect 4: The method of any of aspects 1 through 3, wherein the cell configuration data comprises one or more of a NR Cell Global Identity (NCGI) comprising an identifier of the first donor node, physical cell identifier (PCI) data, an activation status, or cell information.

Aspect 5: The method of any of aspects 1 through 4, wherein the cell information comprises one or more of a Public Land Mobile Network (PLMN) identifier (ID), an area code, a frequency or bandwidth, a cell direction, a cell size, a cell mode, a time-division duplex (TDD) configuration, a measurement timing configuration, cell access information, or connectivity support information.

Aspect 6: The method of any of aspects 1 through 5, further comprising: obtaining a second cell configuration data associated with the RAN node comprising data associated with one or more cells of the RAN node activated by the first donor node; and transmitting the second cell configuration data via the second communications interface to the second donor node for use in migrating the RAN node from the first donor node to the second donor node.

Aspect 7: The method of any of aspects 1 through 6, wherein the obtaining the second cell configuration data associated with the RAN node comprises deriving the second cell information from the first cell configuration via mapping.

Aspect 8: The method of any of aspects 1 through 7, wherein the obtaining the second cell configuration data associated with the RAN node comprises receiving the second cell configuration data from the RAN node via the first communications interface.

Aspect 9: The method of any of aspects 1 through 8, wherein the obtaining the second cell configuration data associated with the RAN node comprises receiving the second cell configuration data from the second donor node via the second communications interface.

Aspect 10: The method of any of aspects 1 through 9, wherein the second cell configuration comprises mapping data for mapping between the first cell configuration data and the second cell configuration data.

Aspect 11: The method of any of aspects 1 through 10, wherein the transmitting the processed cell configuration data comprises transmitting the processed cell configuration data in one of a handover preparation message, a secondary node addition preparation message, a secondary node modification message or a secondary node change message.

Aspect 12: The method of any of aspects 1 through 11, wherein the communications network comprises an Integrated Access and Backhaul (IAB) network.

Aspect 13: The method of any of aspects 1 through 12, wherein the first donor node comprises a first IAB donor node, and the second donor node comprises a second IAB donor node.

Aspect 14: An apparatus in a wireless communication network comprising a first communications interface, a second communications interface, a memory, and a processor coupled to the first communications interface, the second communications interface, and the memory, the processor and the memory configured to perform a method of any one of aspects 1 through 13.

Aspect 15: An apparatus in a wireless communication network comprising means for performing a method of any one of aspects 1 through 13.

Aspect 16: A non-transitory computer-readable medium having stored therein instructions executable by one or more processors of an apparatus to perform a method of any one of aspects 1 through 13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-2, 4-6 and 8-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of migrating a radio access network (RAN) node associated with a first integrated access backhaul (IAB) donor node in an IAB network, comprising:
   receiving, in the first IAB donor node via a first communications interface, cell configuration data associated with the RAN node, the cell configuration data comprising data associated with one or more cells of the RAN node activated by the first IAB donor node, wherein the RAN node is configured with at least one IAB mobile termination functionality (IAB-MT) and at least one IAB distributed unit functionality (IAB-DU) and wherein the cell configuration data includes one or more of a new radio (NR) Cell Global Identity (NCGI);
   processing the cell configuration data for migrating the one or more cells to a second IAB donor node; and
   transmitting the processed cell configuration data, via a second communications interface, to the second IAB donor node for use in migrating the RAN node from the first IAB donor node to the second IAB donor node.

2. The method of claim 1, wherein
   the first communications interface is one of a F1 control (F1-C) interface or a radio resource control (RRC) interface; and the second communications interface is one of an Xn interface or an X2 interface.

3. The method of claim 1, wherein the first IAB donor node comprises a source IAB donor node.

4. The method of claim 1, wherein the one or more of the NCGI comprises an identifier of the first IAB donor node, physical cell identifier (PCI) data, an activation status, or cell information.

5. The method of claim 4, wherein the cell information comprises one or more of a Public Land Mobile Network (PLMN) identifier (ID), an area code, a frequency or bandwidth, a cell direction, a cell size, a cell mode, a time-division duplex (TDD) configuration, a measurement timing configuration, cell access information, or connectivity support information.

6. The method of claim 1, further comprising:
obtaining a second cell configuration data associated with the RAN node comprising data associated with one or more cells of the RAN node activated by the first IAB donor node; and
transmitting the second cell configuration data via the second communications interface to the second IAB donor node for use in migrating the RAN node from the first IAB donor node to the second IAB donor node.

7. The method of claim 6, wherein the obtaining the second cell configuration data associated with the RAN node comprises deriving the second cell information from the first cell configuration via mapping.

8. The method of claim 6, wherein the obtaining the second cell configuration data associated with the RAN node comprises receiving the second cell configuration data from the RAN node via the first communications interface.

9. The method of claim 6, wherein the obtaining the second cell configuration data associated with the RAN node comprises receiving the second cell configuration data from the second IAB donor node via the second communications interface.

10. The method of claim 9, wherein the second cell configuration comprises mapping data for mapping between the first cell configuration data and the second cell configuration data.

11. The method of claim 1, wherein the transmitting the processed cell configuration data comprises transmitting the processed cell configuration data in one of a handover preparation message, a secondary node addition preparation message, a secondary node modification message or a secondary node change message.

12. A first integrated access backhaul (IAB) donor node within an IAB network, comprising:
a first communications interface;
a second communications interface;
a memory; and
a processor communicatively coupled to the transceiver and the memory, wherein the processor is configured to:
receive, in the first IAB donor node via a first communications interface, cell configuration data associated with the RAN node, the cell configuration data comprising data associated with one or more cells of the RAN node activated by the first IAB donor node, wherein the RAN node is configured with at least one IAB mobile termination functionality (IAB-MT) and at least one IAB distributed unit functionality (IAB-DU) and wherein the cell configuration data includes one or more of a new radio (NR) Cell Global Identity (NCGI);
process the cell configuration data for migrating the one or more cells to a second IAB donor node; and
transmit the processed cell configuration data, via a second communications interface, to the second IAB donor node for use in migrating the RAN node from the first IAB donor node to the second IAB donor node.

13. The first IAB donor node of claim 12, wherein
the first communications interface is one of a F1 control (F1-C) interface or a radio resource control (RRC) interface; and
the second communications interface is one of an Xn interface or an X2 interface.

14. The first IAB donor node of claim 12, wherein the first IAB donor node comprises a source IAB donor node.

15. The first IAB donor node of claim 12, wherein the one or more of the NCGI comprises an identifier of the first IAB donor node, physical cell identifier (PCI) data, an activation status, or cell information.

16. The first IAB donor node of claim 15, wherein the cell information comprises one or more of a Public Land Mobile Network (PLMN) identifier (ID), an area code, a frequency or bandwidth, a cell direction, a cell size, a cell mode, a time-division duplex (TDD) configuration, a measurement timing configuration, cell access information, or connectivity support information.

17. The first IAB donor node of claim 12, further comprising:
obtaining a second cell configuration data associated with the RAN node comprising data associated with one or more cells of the RAN node activated by the first IAB donor node; and
transmitting the second cell configuration data via the second communications interface to the second IAB donor node for use in migrating the RAN node from the first IAB donor node to the second IAB donor node.

18. The first IAB donor node of claim 17, wherein the obtaining the second cell configuration data associated with the RAN node comprises deriving the second cell information from the first cell configuration via mapping.

19. The first IAB donor node of claim 17, wherein the obtaining the second cell configuration data associated with the RAN node comprises receiving the second cell configuration data from the RAN node via the first communications interface.

20. The first IAB donor node of claim 17, wherein the obtaining the second cell configuration data associated with the RAN node comprises receiving the second cell configuration data from the second IAB donor node via the second communications interface.

21. The first IAB donor node of claim 20, wherein the second cell configuration comprises mapping data for mapping between the first cell configuration data and the second cell configuration data.

22. The first IAB donor node of claim 12, wherein the transmitting the processed cell configuration data comprises transmitting the processed cell configuration data in one of a handover preparation messages, a secondary node addition preparation message, a secondary node modification message or a secondary node change message.

23. A first integrated access backhaul (IAB) donor node within an IAB network, comprising:
means for receiving, in the first IAB donor node via a first communications interface, cell configuration data associated with the RAN node, the cell configuration data comprising data associated with one or more cells of the RAN node activated by the first IAB donor node, wherein the RAN node is configured with at least one IAB mobile termination functionality (IAB-MT) and at least one IAB distributed unit functionality (IAB-DU) and wherein the cell configuration data includes one or more of a new radio (NR) Cell Global Identity (NCGI);

means for processing the cell configuration data for migrating the one or more cells to a second IAB donor node; and means for transmitting the processed cell configuration data, via a second communications interface, to the second IAB donor node for use in migrating the RAN node from the first IAB donor node to the second IAB donor node.

24. The first IAB donor node of claim 23, wherein the first communications interface is one of a F1-C or radio resource control (RRC) interface; and the second communications interface is one of an Xn or X2 interface.

25. The first IAB donor node of claim 23, further comprising:

means for obtaining a second cell configuration data associated with the RAN node comprising data associated with one or more cells of the RAN node activated by the second IAB donor node; and means for transmitting the second cell configuration data via the second communications interface to the second IAB donor node for use in migrating the RAN node from the first IAB donor node to the second IAB donor node.

26. A non-transitory computer-readable medium having stored therein instructions executable by one or more processors of a first integrated access backhaul (IAB) donor node to:

receive, in the first IAB donor node via a first communications interface, cell configuration data associated with the RAN node, the cell configuration data comprising data associated with one or more cells of the RAN node activated by the first IAB donor node, wherein the RAN node is configured with at least one IAB mobile termination functionality (IAB-MT) and at least one IAB distributed unit functionality (IAB-DU) and wherein the cell configuration data includes one or more of a new radio(NR) Cell Global Identity (NCGI);

process the cell configuration data for migrating the one or more cells to a second IAB donor node; and transmit the processed cell configuration data, via a second communications interface, to the second IAB donor node for use in migrating the RAN node from the first IAB donor node to the second IAB donor node.

* * * * *